United States Patent
Pantelidou et al.

(10) Patent No.: US 12,557,095 B2
(45) Date of Patent: Feb. 17, 2026

(54) UPLINK TRANSMISSION FAILURE (71) Applicant: Nokia Technologies Oy, Espoo (FI)

(72) Inventors: Anna Pantelidou, Antony (FR); Arto Lehti, Antony (FR)

(73) Assignee: Nokia Technologies Oy, Espoo (FI)

( * ) Notice: Subject to any disclaimer, the term of this patent is extended or adjusted under 35 U.S.C. 154(b) by 377 days.

(21) Appl. No.: 18/246,272

(22) PCT Filed: Sep. 15, 2021

(86) PCT No.: PCT/EP2021/075261
§ 371 (c)(1),
(2) Date: Mar. 22, 2023

(87) PCT Pub. No.: WO2022/078692
PCT Pub. Date: Apr. 21, 2022

(65) Prior Publication Data
US 2023/0354319 A1 Nov. 2, 2023

(30) Foreign Application Priority Data

Oct. 14, 2020 (EP) .................................... 20201660

(51) Int. Cl.
*H04W 72/1268* (2023.01)
*H04W 72/12* (2023.01)
(52) U.S. Cl.
CPC ....... *H04W 72/1268* (2013.01); *H04W 72/12* (2013.01)
(58) Field of Classification Search
CPC .. H04W 72/1268; H04W 72/12; H04W 24/10
See application file for complete search history.

(56) References Cited

U.S. PATENT DOCUMENTS

| 10,624,126 | B2 | 4/2020 | Novlan et al. |
| 2018/0249526 | A1 | 8/2018 | Nagaraja et al. |
| 2018/0367255 | A1 | 12/2018 | Jeon et al. |
| 2019/0075581 | A1 | 3/2019 | Salem et al. |
| 2019/0124690 | A1* | 4/2019 | Siomina ................ H04W 24/10 |
| 2019/0174539 | A1* | 6/2019 | Siomina ............ H04W 72/1273 |
| 2019/0380052 | A1* | 12/2019 | Yang ..................... H04W 72/23 |
| 2020/0404655 | A1* | 12/2020 | Salem ............... H04W 72/0446 |

(Continued)

FOREIGN PATENT DOCUMENTS

| WO | 2017/118142 A1 | 7/2017 |
| WO | 2019/195465 A1 | 10/2019 |
| WO | 2020/067667 A1 | 4/2020 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

(Continued)

*Primary Examiner* — Liem H. Nguyen
(74) *Attorney, Agent, or Firm* — Barta Jones, PLLC (57) ABSTRACT

A terminal configured to: receive a monitoring configuration comprising an uplink transmission type identifier; perform monitoring, in accordance with the monitoring configuration, to determine a failure rate of the uplink transmission type; and transmit a monitoring result dependent upon the performed monitoring.

7 Claims, 5 Drawing Sheets

(56) References Cited

U.S. PATENT DOCUMENTS

| | | | | |
|---|---|---|---|---|
| 2023/0171802 A1* | 6/2023 | Nunome | ............ | H04W 74/0808 370/329 |
| 2023/0189055 A1* | 6/2023 | Tooher | .............. | H04W 28/0268 370/328 |
| 2023/0199749 A1* | 6/2023 | Gerami | ................ | H04W 72/21 370/329 |

OTHER PUBLICATIONS

"3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", 3GPP TS 37.320, V16.0.0, Mar. 2020, pp. 1-34.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"3rd Generation Partnership Project; Technical Specification Group Services and System Aspects; Service requirements for cyber-physical control applications in vertical domains; Stage 1 (Release 17)", 3GPP TS 22.104, V17.2.0, Dec. 2019, pp. 1-76.

"3rd Generation Partnership Project; Technical Specification Group Radio Access Network; Study on physical layer enhancements for NR ultra-reliable and low latency case (URLLC) (Release 16)", 3GPP TR 38.824, V16.0.0, Mar. 2019, pp. 1-78.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"Revised WID on enhancement of data collection for SON/MDT in NR and EN-DC", 3GPP TSG RAN meeting #88-e, RP-200768, Agenda: 9.10.14, CMCC, Jun. 26-Jul. 3, 2020, 5 pages.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

Lagen et al., "New Radio Beam-based Access to Unlicensed Spectrum: Design Challenges and Solutions", arXiv, Oct. 23, 2019, pp. 1-30.

Extended European Search Report received for corresponding European Patent Application No. 20201660.6, dated Mar. 24, 2021, 8 pages.

"Transmission with configured grant in NR unlicensed band", 3GPP TSG RAN WG1 Meeting #96bis, R1-1903931, Agenda: 7.2.2.2.4, Huawei, Apr. 8-12, 2019, 19 pages.

International Search Report and Written Opinion received for corresponding Patent Cooperation Treaty Application No. PCT/EP2021/075261, dated Nov. 12, 2021, 11 pages.

Office Action received for corresponding European Patent Application No. 20201660.6, dated May 21, 2024, 5 pages.

"Impact of systematic LBT failure on UL transmission procedure", 3GPP TSG-RAN WG2 Meeting #107bis, R2-1912684, Agenda item: 6.2.2.2, Lenovo, Oct. 14-18, 2019, pp. 1-2.

* cited by examiner

UPLINK TRANSMISSION FAILURE

RELATED APPLICATION

This application claims priority to PCT Application No. PCT/EP2021/075261, filed on Sep. 15, 2021, which claims priority to EP Application No. 20201660.6 filed on Oct. 14, 2020, each of which is incorporated herein by reference in its entirety.

TECHNOLOGICAL FIELD

Embodiments of the present disclosure relate to uplink transmission failure.

BACKGROUND

Uplink transmission occurs in a radio network in a direction from a network terminal towards a network access node.

Radio transmissions are susceptible to interference. Consequently, uplink transmission can be susceptible to interference.

It is preferable that uplink transmissions do not suffer significant interference.

BRIEF SUMMARY

According to various, but not necessarily all, embodiments there is provided a terminal configured to:
  receive a monitoring configuration comprising an uplink transmission type identifier;
  perform monitoring, in accordance with the monitoring configuration, to determine a failure rate of the uplink transmission type; and
  transmit a monitoring result dependent upon the performed monitoring.

According to various, but not necessarily all, embodiments there is provided a computer program that when run by a processor of a terminal, enables the terminal to:
  perform monitoring, in accordance with a received monitoring configuration, to determine a failure rate of an uplink transmission type identified by the received monitoring configuration; and
  transmit a monitoring result dependent upon the performed monitoring.

According to various, but not necessarily all, embodiments there is provided a node configured to:
  transmit a monitoring configuration, comprising an uplink transmission type identifier, to a terminal;
  receive from the terminal a monitoring result in dependence upon the monitoring configuration and a failure rate of the uplink transmission type;
  Wherein in dependence on the received monitoring result, the node is configured to cause adaptation of a scheduling of an uplink transmission type of at least one terminal.

According to various, but not necessarily all, embodiments there is provided a computer program that when run by a node of a network, enables the node to:
  transmit a monitoring configuration, comprising an uplink transmission type identifier, to a terminal;
  receive from the terminal a monitoring result in dependence upon the monitoring configuration and a failure rate of the uplink transmission type;
  cause adaptation of a scheduling of an uplink transmission type of at least one terminal in dependence on the received monitoring result.

According to various, but not necessarily all, embodiments there is provided a node configured to:
  receive a message from a neighboring node in dependence upon a monitoring result for a transmission type received at the neighboring node from a terminal that is served by the neighboring node
  Wherein in dependence of the message the node is configured to cause adaptation of the scheduling of a transmission type of at least one terminal served by the node According to various, but not necessarily all, embodiments there is provided a computer program that when run by a node of a network, enables the node to:
  receive a message from a neighboring node in dependence upon a monitoring result for a transmission type received at the neighboring node from a terminal that is served by the neighboring node but not the node; and
  cause adaptation of the scheduling of a transmission type of at least one terminal served by the node in dependence on the received message.

According to various, but not necessarily all, embodiments there is provided a method, at a terminal, comprising:
  monitoring, in accordance with a received monitoring configuration, to determine a failure rate of an uplink transmission type identified by the received monitoring configuration; and
  transmitting a monitoring result dependent upon the performed monitoring.

According to various, but not necessarily all, embodiments there is provided a method, at a network node, comprising:
  transmitting a monitoring configuration, comprising an uplink transmission type identifier, to a terminal;
  receiving from the terminal a monitoring result in dependence upon the monitoring configuration and a failure rate of the uplink transmission type;
  causing adaptation of a scheduling of an uplink transmission type of at least one terminal in dependence on the received monitoring result.

According to various, but not necessarily all, embodiments there is provided a method, at a network node, comprising:
  receiving a message from a neighboring node in dependence upon a monitoring result for a transmission type received at the neighboring node from a terminal that is served by the neighboring node but not the node; and
  causing adaptation of the scheduling of a transmission type of at least one terminal served by the node in dependence on the received message.

According to various, but not necessarily all, embodiments there is provided examples as claimed in the appended claims.

The following portion of this 'Brief Summary' section, describes various features that may be features of any of the embodiments described in the foregoing portion of the 'Brief Summary' section. The description of a function should additionally be considered to also disclose any means suitable for performing that function In some but not necessarily all examples, the uplink transmission type identifier identifies the uplink transmissions as uplink transmissions that use scheduled uplink resources.

In some but not necessarily all examples, the uplink transmission type identifier identifies the uplink transmissions as uplink transmissions using configured grant.

In some but not necessarily all examples, the uplink transmission type identifier identifies the uplink transmissions as uplink transmissions using configured grant that is configured without layer 1 signaling or with layer 1 signaling.

In some but not necessarily all examples, the monitoring configuration configures monitoring of the failure rate of the uplink transmission type In some but not necessarily all examples, the monitoring configuration configures monitoring of listen before talk (listen before transmit) performance of the uplink transmission type, wherein the failure rate is the listen before talk failure rate of the uplink transmission type.

In some but not necessarily all examples, the monitoring configuration configures monitoring of the uplink transmission type when using a shared licensed frequency resource or an unlicensed frequency resource.

In some but not necessarily all examples, the monitoring configuration configures when monitoring of the uplink transmission type occurs and/or when a result of monitoring of the uplink transmission type is reported.

In some but not necessarily all examples, the monitoring configuration configures when monitoring of the uplink transmission type occurs and/or when a result of monitoring of the uplink transmission type is reported by using one or more trigger parameters in the monitoring configuration, wherein a trigger parameter is an event-based trigger parameter and/or a time-based trigger parameter.

In some but not necessarily all examples, the monitoring result at least identifies the uplink transmission type.

In some but not necessarily all examples, the terminal is configured to adapt a scheduling of the uplink transmission type, after transmitting the monitoring result, only in response to command from the node.

In some but not necessarily all examples, the uplink transmission type is used for uplink communication for one or more the following purposes:
the terminal provides periodic deterministic communication;
the terminal provides monitoring results for one or more industrial wireless sensors;
the terminal provides a node in the Industrial Internet of Things;
the terminal is configured to provide 3GPP ultra reliable low latency communication;
the terminal provides real-time measurement
the terminal provides power distribution monitoring;
the terminal is a component of a factory automation system;
the terminal is a component of a transport automation system;
the apparatus is a component that enables remote driving of a vehicle.

In some but not necessarily all examples, the terminal is configured as mobile equipment or user equipment of a radio network.

BRIEF DESCRIPTION

Some examples will now be described with reference to the accompanying drawings in which.

DETAILED DESCRIPTION

In the drawings (and description) a similar feature is referenced by the same three digit number. In the drawings (and description), an optional subscript to the three digit number can be used to differentiate different instances of similar features. Therefore a three digit number without a subscript can be used as a generic reference and the three digit number with a subscript can be used as a specific reference. A subscript can comprise a single digit that labels different instances. A subscript can comprise two digits including a first digit that labels a group of instances and a second digit that labels different instances in the group.

Figure 1:
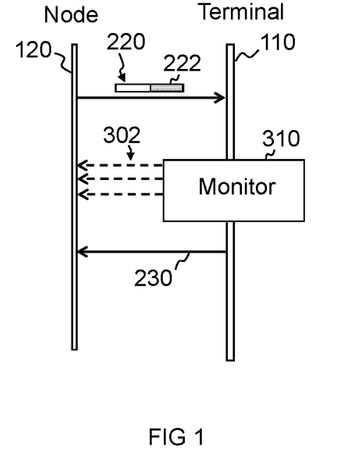
FIG. 1 shows an example of the subject matter described herein.

FIG. 1 illustrates an example of a terminal 110 configured to:
receive a monitoring configuration 220 comprising an uplink transmission type identifier 222;
perform monitoring 310, in accordance with the received monitoring configuration 220, to determine a failure rate of the uplink transmission type; and
transmit a monitoring result 230 dependent upon the performed monitoring 310.

The monitoring result 230 is dependent upon the determined failure rate of the uplink transmission type.

The uplink transmission type identifier 222 identifies the uplink transmission type of the uplink transmissions 302 that are monitored to determine the failure rate of the uplink transmission type.

In at least some examples, the monitored uplink transmissions 302 use scheduled uplink resources such as allocated time slots and/or allocated frequencies. For example, in some examples, the monitored uplink transmissions 302 use scheduled periodic uplink resources.

In some but not necessarily all examples, the uplink transmission type identifier 222 identifies the uplink transmissions 302 as uplink transmissions using configured grant. Configured grant configures uplink resources for uplink transmission 302 in advance.

The failure rate can be any measure that is dependent upon failure of the uplink transmissions 302 corresponding to the identified uplink transmission type over a time period. It does not have to be expressed in the dimensions of a rate. It can, for example, be a binary or digital flag or some other metric.

In some but not necessarily all examples, the monitoring configuration 220 configures monitoring 310 of the failure rate of the uplink transmissions 302 corresponding to the identified uplink transmission type.

For example, a parameter comprised in the monitoring configuration 220 specifies one or more characteristics of the failure rate.

For example, the uplink transmission type identifier 222 comprised in the monitoring configuration 220 identifies the uplink transmission type.

In some but not necessarily all examples, the monitoring configuration 220 configures monitoring 310 of listen before talk (also "listen before transmit") performance of the uplink transmissions 302 corresponding to the identified uplink transmission type 302. The monitored failure rate is the listen before talk (LBT) failure rate of the uplink transmissions 302 corresponding to the identified uplink transmission type 302.

The LBT failure rate can, for example, be the number of times an uplink transmission 302 corresponding to the identified uplink transmission type is not performed because the resource used by the identified uplink transmission type is in use.

In some examples of LBT, an uplink transmission 302 corresponding to the identified uplink transmission type is not performed when the terminal detects other transmissions at a resource allocated to the uplink transmission 302.

In some but not necessarily all examples, the monitoring configuration 220 specifies a calculation of the failure rate.

In some but not necessarily all examples, the monitoring configuration 220 configures monitoring 310 of the uplink transmissions 302 corresponding to the identified uplink transmission type when the uplink transmissions 302 are using a shared licensed frequency resource or an unlicensed frequency resource. An example of an unlicensed frequency resource is a frequency or range of frequencies within the unlicensed Industrial, Scientific Medical (ISM) bands.

In some but not necessarily all examples, the monitoring configuration 220 configures at what point in time monitoring 310 of the uplink transmissions 302 corresponding to the identified uplink transmission type occurs and/or at what point in time a result 230 of monitoring 310 of the uplink transmissions 302 corresponding to the identified uplink transmission type is reported.

For example, the monitoring configuration 220 can, in some examples, comprise one or more trigger parameters. The one or more trigger parameters configure at what point in time monitoring of the uplink transmissions 302 corresponding to the identified uplink transmission type occurs and/or at what point in time a result of monitoring 310 of the uplink transmissions 302 corresponding to the identified uplink transmission type occurs. A trigger parameter can be an event-based trigger parameter that defines the respective point in time relative to an event. A trigger parameter can be a time-based trigger parameter that defines the respective point in time relative to another time.

The monitoring configuration 220 can, in some examples, cause monitoring 310 of the uplink transmissions 302 corresponding to the identified uplink transmission type to occur immediately on receipt of the monitoring configuration or with a time or event-based delay.

The monitoring configuration 220 can, in some examples, cause monitoring 310 of the uplink transmissions 302 corresponding to the identified uplink transmission type to occur periodically.

The monitoring configuration 220 can, in some examples, cause transmission of a monitoring result 230 dependent upon the performed monitoring 310 to occur in real-time, which depending on the case can be reflected in delay of less than 100 ms, for example less than tens of milliseconds. In some examples, the delay in transmission of a monitoring result is with low latency (less than 100 ms) or lower latency (less than 5 ms) or lowest latency (less than 2 ms).

The monitoring configuration 220 can, in some examples, cause transmission of a monitoring result 230 dependent upon the performed monitoring 310 to occur after a first LBT failure, after a number of LBT failures (or successes), or after the LBT failure rate exceeds a threshold value. The threshold value can, for example, be defined by the monitoring configuration. The parameter(s) for controlling monitoring and/or controlling reporting of monitoring can be event-based.

In at least some examples, the monitoring result 230 at least identifies the uplink transmission type. In some examples, the monitoring result comprises an indication of a value of the failure rate. In some examples, the monitoring result comprises an identification of the failure rate, for example, as a LBT failure rate. These characteristics of the monitoring result can, for example, be specified by the monitoring configuration 220.

It will therefore be appreciated that in at least some examples the monitoring configuration 220 can have variable parameters that can be changed. The number and/or identity of parameters within the monitoring configuration 220 can, for example, be changed. In some examples, a value of a parameter within the monitoring configuration 220 can be changed. It is therefore possible to control flexibly one or more of: what is monitored 310, how it is monitored 310, when it is monitored 310, how the result 230 of monitoring is reported, when the result 230 of monitoring is reported.

The uplink transmissions 302 of the identified uplink transmission type can, for example, be used for uplink communication for one or more of the following purposes:
- the terminal 110 provides periodic deterministic communication;
- the terminal 110 provides monitoring results for one or more industrial wireless sensors;
- the terminal 110 provides a node in the Industrial Internet of Things;
- the terminal 110 is configured to provide 3GPP ultra reliable low latency communication;
- the terminal 110 provides real-time measurements;
- the terminal 110 provides power distribution monitoring;
- the terminal 110 is a component of a factory automation system;
- the terminal 110 is a component of a transport automation system;
- the terminal 110 is a component that enables remote driving of a vehicle.

Figure 2:
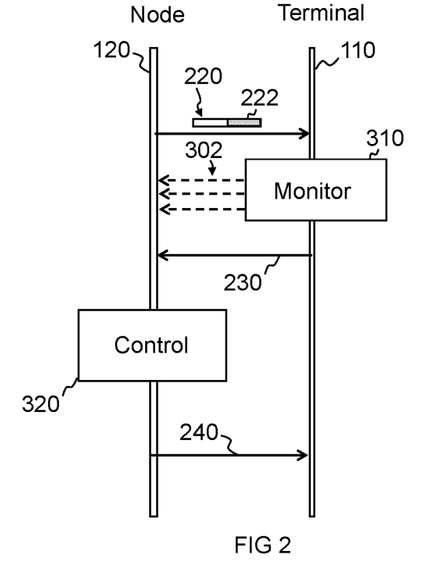
FIG. 2 shows another example of the subject matter described herein.

FIG. 2 illustrates an example of a terminal 110, as previously described with reference to FIG. 1. The description provided with reference to FIG. 1 is also relevant to FIG. 2.

As in FIG. 1, the terminal 110 is configured to: receive a monitoring configuration 220 comprising an uplink transmission type identifier 222;
- perform monitoring 310, in accordance with the monitoring configuration 220, to determine a failure rate of the uplink transmission type; and
- transmit a monitoring result 230 dependent upon the performed monitoring 310.

As in FIG. 1, a node 120 is configured to:
- transmit the monitoring configuration 220, comprising the uplink transmission type identifier 222, to the terminal 110;

receive from the terminal 110 the monitoring result 230 in dependence upon the monitoring configuration 220 and the failure rate of the uplink transmission type.

In FIG. 2, in dependence on the received monitoring result 230, the node 120 is configured to cause 320 adaptation of a scheduling of an uplink transmission type of at least one terminal 110.

In the example illustrated, the node 120 is a serving node of the terminal 110. In a 3GPP implementation the serving node 120 is a base station, for example a gNB, that serves the cell on which the terminal 110 (user equipment) is camped.

The node 120, in dependence upon the received monitoring result 230, can control 320 adjustment of scheduling of the uplink transmission type.

In the example illustrated but not necessarily all examples, the node 120, in dependence upon the received monitoring result 230, transmits a control message 240 to the terminal 110 to instruct the terminal 110 to adapt a scheduling of the uplink transmission type. This can avoid interference arising on the current schedule. For example, this can avoid unintended synchronization with scheduling of uplink transmissions with other terminals served by the node 120. In some examples, the node 120 can use information received from other nodes (e.g. via information messages sent through an interface, for example an X2 or Xn interface) to avoid unintended synchronization with scheduling of uplink transmissions with other terminals served by different nodes.

In some but not necessarily all examples, the terminal 110 does not control adaptation of a scheduling of uplink transmissions 302 of the uplink transmission type, after transmitting the monitoring result 230, but instead responds to the control message 240 from the node 120. Thus, in some examples, the terminal 110 adapts a scheduling of uplink transmissions 302 of the uplink transmission type, after transmitting the monitoring result 230, only in response to a command (control message 240) from the node 120.

The node 120 can control measurement and schedule resourcing on a per terminal basis. This can improve radio resource planning by the network.

Figure 3:
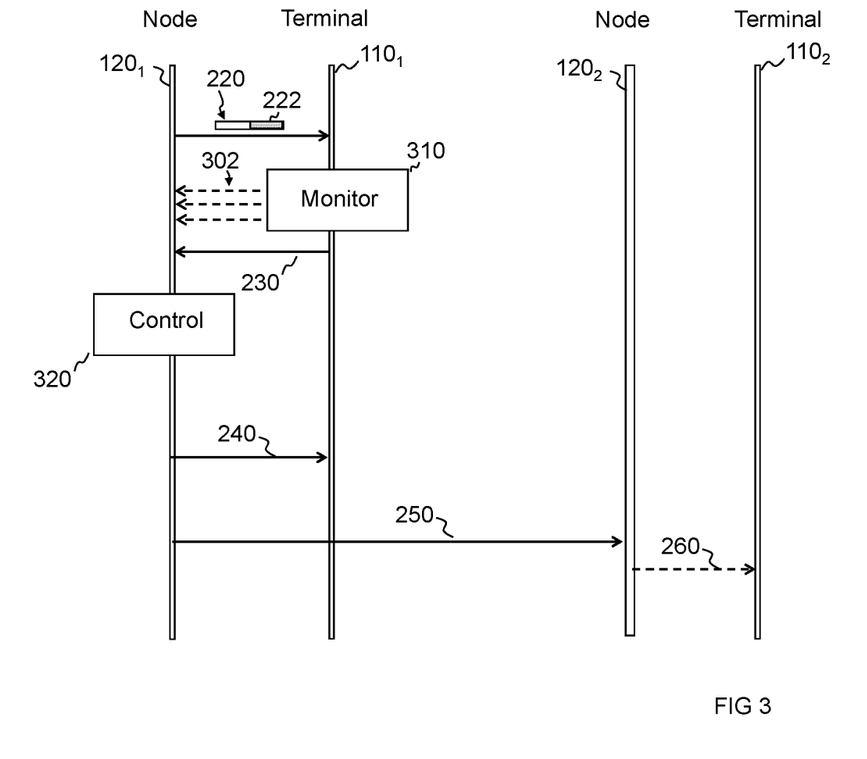
FIG. 3 shows another example of the subject matter described herein.

FIG. 3 illustrates an example of a terminal 110, as previously described with reference to FIG. 1 and FIG. 2. The description provided with reference to FIG. 1 and FIG. 2 is also relevant to FIG. 3.

The example illustrates a serving node $120_1$ of a terminal $110_1$. A non-serving node $120_2$ does not serve terminal $110_1$ but does serve terminal $110_2$. In a 3GPP implementation the serving node $120_1$ is a base station, for example a gNB, that serves the cell on which the terminal $110_1$ (user equipment) is camped. The node $120_2$ is a base station, for example a gNB, that serves the cell on which the terminal $110_2$ (user equipment) is camped.

The node $120_2$ is a non-serving node from the perspective of the terminal $110_1$. However, it should also be realized that it is a serving node from the perspective of the terminal $110_2$.

As in FIGS. 1 and 2, the terminal $110_1$ is configured to:
receive a monitoring configuration 220 comprising an uplink transmission type identifier 222;
    perform monitoring 310, in accordance with the monitoring configuration 220, to determine a failure rate of the uplink transmission type; and
    transmit, to the node $120_1$, a monitoring result 230 dependent upon the performed monitoring 310.

The node $120_1$ is configured to:
transmit the monitoring configuration 220, comprising an uplink transmission type identifier 222, to the terminal $110_1$;
receive from the terminal $110_1$ a monitoring result 230 in dependence upon the monitoring configuration 220 and a failure rate of the uplink transmission type;
wherein in dependence on the received monitoring result 230, the node $120_1$ is configured to cause 320 adaptation of a scheduling of an uplink transmission type of at least one terminal $110_1$, $110_2$.

In the example illustrated, but not necessarily in all examples, the node $120_1$, in dependence upon the received monitoring result 230, transmits a control message 240 to the terminal $110_1$ to instruct the terminal $110_1$ to adapt a scheduling of the uplink transmission type. This can avoid interference arising on the current schedule. For example, this can avoid unintended synchronization with scheduling of uplink transmissions with other terminals $110_{1x}$,x=1, 2, . . . (not illustrated in this FIG, see FIG. 5 & 6) served by the node 120. In some examples, the node 120 can use information received from other nodes (e.g. via information messages 250 sent through an interface, for example an X2 or Xn interface) to avoid unintended synchronization with scheduling of uplink transmissions with other terminals served by different nodes 120.

In some, but not necessarily all examples, the terminal $110_1$ does not control adaptation of a scheduling of uplink transmissions 302 of the uplink transmission type, after transmitting the monitoring result 230, but instead responds to the control message 240 from the node $120_1$. Thus, in some examples, the terminal $110_1$ adapts a scheduling of uplink transmissions 302 of the uplink transmission type, after transmitting the monitoring result 230, only in response to a command (control message 240) from the node $120_1$.

The node $120_1$ can control measurement and schedule resourcing on a per terminal basis. This can improve radio resource planning by the network.

In the example illustrated but not necessarily all examples, the serving node $120_1$, in dependence upon the received monitoring result 230, transmits an information message 250 to the neighboring node $120_2$ to inform the neighboring node $120_2$ of an adaptation of scheduling of the uplink transmission type by the node $120_1$.

The neighboring node $120_2$ can, in some examples, transmit a control message 260 to a terminal $110_2$, served by the neighboring node $120_2$, to instruct the terminal $110_2$ to adapt a scheduling of the uplink transmission type.

This can avoid interference arising on the new schedule. For example, this can avoid unintended synchronization with scheduling of uplink transmissions with other terminals $110_{2x}$, x=1,2, . . . (not illustrated in this FIG, see FIG. 5 & 6) served by the node $120_2$. In some examples, the node $120_2$ can use the information received in the information message 250 received from the node $120_1$ (e.g. via an interface, for example an X2 or Xn interface) to avoid unintended synchronization with scheduling of uplink transmissions controlled by the node $120_2$ with uplink transmissions controlled by the node $120_1$.

In this example, the node $120_2$ is configured to:
receive a message 250 from a neighboring node $120_1$ in dependence upon a monitoring result 230 for a transmission type received at the neighboring node $120_1$ from a terminal $110_1$ that is served by the neighboring node $120_1$, wherein in dependence on the message 250 the node $120_2$ is configured to cause adaptation of the scheduling of a transmission type of at least one terminal $110_2$ served by the node $120_2$.

The node $120_2$ can control measurements and schedule resourcing on a per terminal basis. This can improve radio resource planning by the network.

Figure 5:
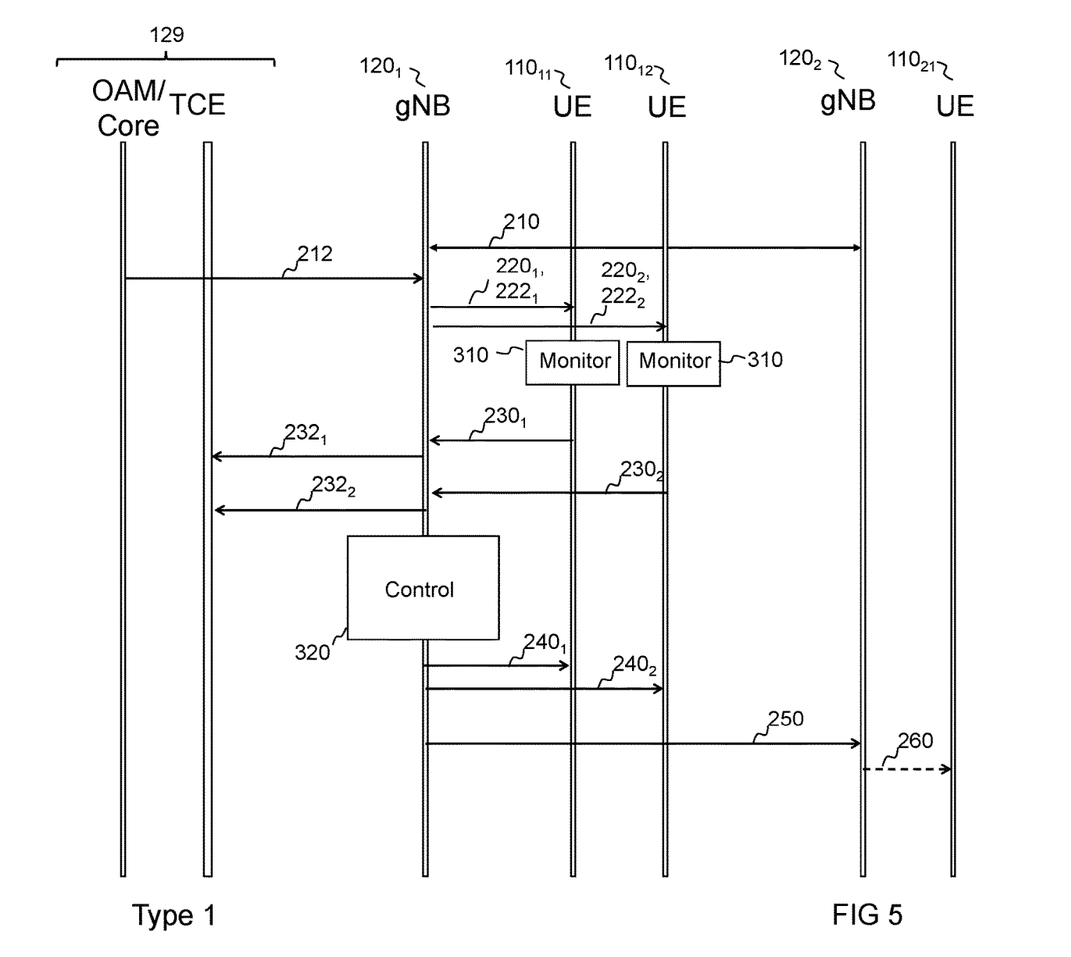
FIG. 5 shows another example of the subject matter described herein.
Figure 6:
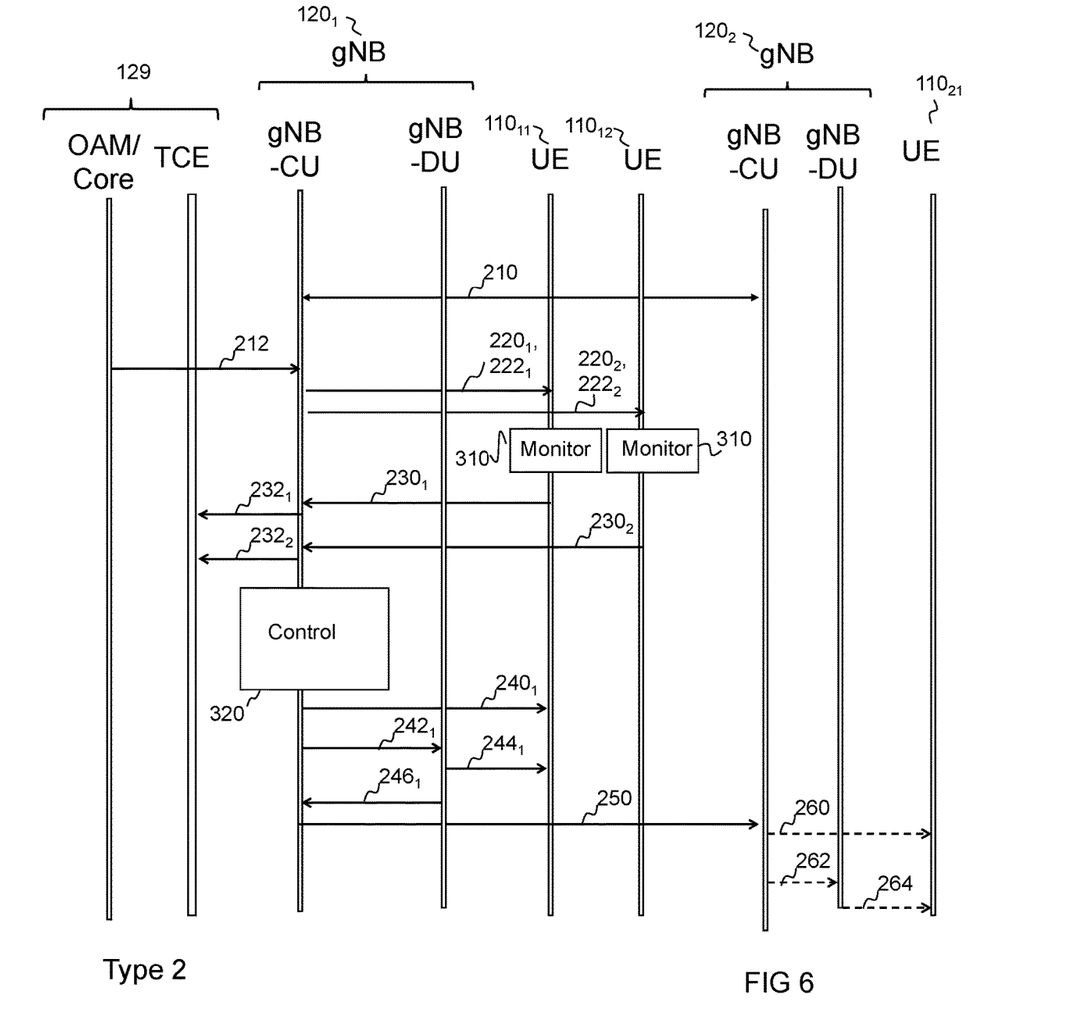
FIG. 6 shows another example of the subject matter described herein.

It should be appreciated that although a single terminal $110_1$ is illustrated as being served by the node $120_1$, in at least some examples the node $120_1$ can serve multiple terminals $110_1$ contemporaneously (not illustrated in this FIG, see FIG. 5 & 6). The interaction between the node $120_1$ and a terminal $110_{1x}$, x=1,2, ... can be as described for the node $120_1$ and the terminal $110_1$.

It should be appreciated that although the description focuses on the node $120_1$, the terminal $110_1$, and their interaction, the interaction of the node $120_2$ and the terminal $110_2$ can be as described for of the node $120_1$ and the terminal $110_1$.

A network can therefore have multiple terminals 110 each of which is configured to: receive from a node 120 a monitoring configuration 220 comprising an uplink transmission type identifier 222;
  perform monitoring 310, in accordance with the monitoring configuration 220, to determine a failure rate of the uplink transmission type; and
  transmit to the node 120 a monitoring result 230 dependent upon the performed monitoring 310.

The network can have multiple nodes $120_i$ configured to:
transmit the monitoring configuration 220, comprising the uplink transmission type identifier 222, to a terminal $110_i$;
receive from the terminal $110_i$ a monitoring result 230 in dependence upon the monitoring configuration 220 and a failure rate of the uplink transmission type;
wherein in dependence on the received monitoring result 230, the node $120_i$ is configured to cause 320 adaptation of a scheduling of an uplink transmission type of at least one terminal $110_i$. In the example described for FIG. 3, the index i satisfies i=1.

The network can have multiple nodes $120_i$ configured to:
receive a message 250 from a neighboring node $120_j$ in dependence upon a monitoring result 230 for a transmission type received at the neighboring node $120_j$ from a terminal $110_j$ that is served by the neighboring node $120_j$, wherein in dependence on the message 250 the node $120_i$ is configured to cause adaptation of the scheduling of a transmission type of at least one terminal $110_i$ served by the node $120_i$. In the example described for FIG. 3, the indices i and j satisfy i=2, j=1.

It should be appreciated that a node $120_i$ can be configured to:
  transmit a monitoring configuration 220, comprising an uplink transmission type identifier 222, to a terminal $110_i$ served by the node $120_i$;
  receive from the terminal $110_i$ a monitoring result 230 in dependence upon the monitoring configuration 220 and a failure rate of the uplink transmission type;
  wherein in dependence on the received monitoring result 230, the node $120_i$ is configured to cause 320 adaptation of a scheduling of an uplink transmission type of the terminal $110_i$.
and the node $120_i$ is also be configured to:
  receive a message 250 from a neighboring node $120_k$ in dependence upon a monitoring result 230 for a transmission type received at the neighboring node $120_k$ from a terminal $110_k$ that is served by the neighboring node $120_k$ wherein in dependence on the message 250 the node $120_i$ is configured to cause adaptation of the scheduling of a transmission type of at least one terminal $110_i$ served by the node $120_i$. In the example described for FIG. 3, the indices i and k satisfy i=1, k=2.

It will therefore be appreciated that there is co-operation between terminals $110_i$ and a serving node $120_i$ and also cooperation between nodes 120. This cooperation enables a self-organizing network.

The cooperation enables scheduling of the transmission 302 of the identified transmission type (and other transmissions) to be scheduled to avoid or reduce interference.

Figure 4:
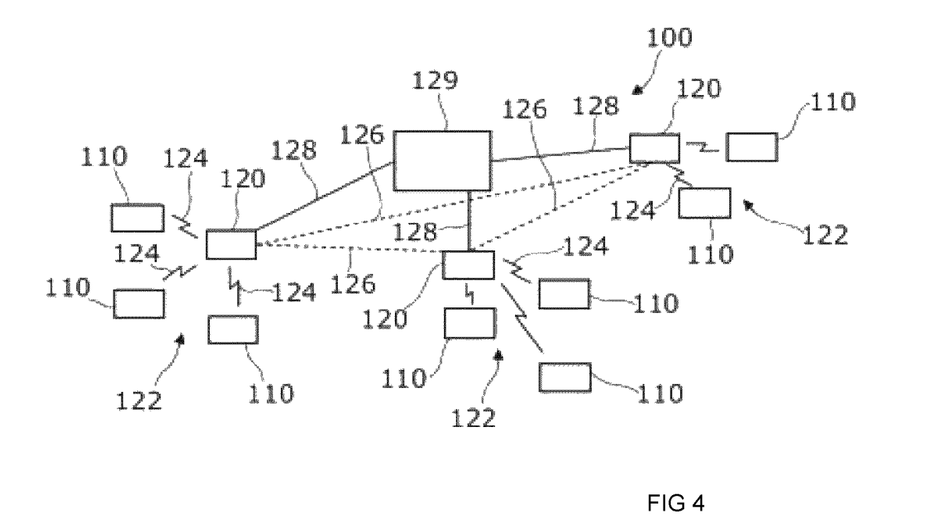
FIG. 4 shows another example of the subject matter described herein.

FIG. 4 illustrates an example of a network 100 comprising a plurality of network nodes including terminal nodes 110 (terminals 110), access nodes 120 and one or more core nodes 129. The terminal nodes 110 and access nodes 120 communicate with each other. The one or more core nodes 129 communicate with the access nodes 120.

The network 100 is in this example a radio telecommunications network, in which at least some of the terminal nodes 110 and access nodes 120 communicate with each other using transmission/reception of radio waves.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 (terminals 110) are user equipment (UE) and the access nodes 120 are base stations.

In the particular example illustrated, the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In other examples the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an interface, for example an X2 or Xn interface 126. The gNBs are also connected by means of the N2 interface 128 to the Access and Mobility management Function (AMF).

A user equipment comprises a mobile equipment. Where reference is made to user equipment, this reference includes and encompasses, wherever possible, a reference to mobile equipment.

The terminal(s) 110 described can be a terminal node(s) 110 of the network 100. The node(s) 120 can be an access node(s) 120 of the network 100.

In some examples, a terminal 110 is a user equipment configured for minimization of drive testing (MDT). The user equipment is configured to collects information for the network 100.

In some examples, an access node 120 can be split into a central unit (CU) and one or more distributed units (DU). The CU is a logical node that includes the gNB functions not allocated to the DU(s). The CU controls the operation of the DU(s). In at least some examples, the CU hosts RRC, PDCP and SDAP layers, and each DU hosts PHY, MAC, and RLC layers.

Particular use cases of the examples previously described will be described with reference to FIGS. 5 and 6.

In these examples, the monitoring 310, which is performed at the terminal $110_{11}$ in accordance with the received monitoring configuration 220, determines a listen before talk (LBT) failure rate of transmission 302. The monitoring is performed on a per terminal 110 basis. The monitoring can be controlled on a per terminal 110 basis or on a per group of terminals 110 basis. The monitoring can be controlled to be for a specific access type for the uplink transmission 302 via the uplink transmission type identifier 222. The access type can be any suitable access type for which LBT is performed.

In these particular examples, the monitoring 310, which is performed at the terminal $110_{11}$ in accordance with the received monitoring configuration 220, determines a LBT failure rate of configured grant transmissions 302 (not illustrated in these FIGs). The uplink transmission type is configured grant.

The uplink transmission type identifier 222 identifies the uplink transmissions 302 as uplink transmissions using configured grant.

In some examples, the uplink transmission type identifier 222 identifies the uplink transmissions 302 as uplink transmissions using configured grant Type 1 or using configured grant Type 2.

Failure rate can be further calculated separately per Type (e.g., only for Type 1 or only for Type 2 uplink (UL) Grants) or cumulatively (e.g., Type 1 and Type 2 UL Grants).

In the example of FIG. 5, the monitored configured grant transmissions are Type 1 configured grant transmissions 302. The identified uplink transmission type is configured grant (Type 1). The uplink transmission type identifier 222 identifies the uplink transmissions 302 as uplink transmissions using configured grant that is configured with layer 3 (RRC) signaling (Type 1).

In the example of FIG. 6, the monitored configured grant transmissions are Type 2 configured grant transmissions 302. The identified uplink transmission type is configured grant (Type 2). The uplink transmission type identifier 222 identifies the uplink transmissions 302 as uplink transmissions using configured grant that is configured with both layer 1 and layer 3 signaling (Type 2).

In the example of FIG. 6 the node 120 is split into a CU and a DU (although this is not a requirement). The split architecture has been previously described. For example, The CU is a logical node that includes the gNB functions not allocated to the DU(s). The CU controls the operation of the DU(s). In at least some examples, the CU terminates layer 3 (RRC) and the DU(s) terminate layer 1 (PHY).

Therefore in FIG. 5 the control of reconfiguring the configured grant for the terminal $110_{1x}$ uses a single RRC control message $240_x$ delivered from (a CU of) the gNB node $120_1$ to terminal $110_{1x}$, whereas in FIG. 6 the control of reconfiguring the configured grant for the terminal $110_{1x}$ uses a RRC control message $240_x$ delivered from the CU of the gNB node $120_1$ to terminal $110_{1x}$ and a message $242_x$ delivered from the CU of the gNB node $120_1$ to the DU of gNB node $120_1$ which causes the DU of the gNB node $120_1$ to send a PHY message $244_x$ to the terminal $110_{1x}$.

Therefore in FIG. 5 the control of reconfiguring the configured grant for the terminal $110_{21}$ uses a single RRC control message 260 delivered from (the CU of) the gNB node $120_2$ to terminal $110_{21}$, whereas in FIG. 6 the control of reconfiguring the configured grant for the terminal $110_{21}$ uses a RRC control message 260 delivered from the CU of the gNB node $120_2$ to terminal $110_{21}$ and a message 262 delivered from the CU of the gNB node $120_2$ to the DU of gNB node $120_2$ which causes the DU of the gNB node $120_2$ to send a PHY message 264 to the terminal $110_{21}$.

The description of FIG. 3 is also a description of FIG. 5 and equivalent references have been used. FIG. 5 additionally illustrates Organization, Administration and Management (OAM) functionality 129 and in this example a trace collection entity (TCE) at the OAM 129. In other examples, 129 could be replaced by a Core network and TCE can be still placed at the OAM component. In other examples, TCE may be replaced by a different repository responsible to collect the measurements.

There is (optionally) additional communication 210 between the nodes $120_1$, $120_2$. The messaging 210 between nodes 120 informs the nodes of scheduling of transmission 302 and, in particular transmission 302 of the identified uplink transmission type. The signaling can be via an Xn application protocol or via an X2 application protocol.

There is additional communication 212 between the OAM and node $120_1$. The communication 212 provides trace activation parameters. These control the node $120_1$ to prepare and transmit the same monitoring configuration 220 comprising the uplink transmission type identifier 222 to the terminals $110_{11}$, $110_{21}$.

There is additional communication 232 between the nodes $120_1$, $120_2$ and the core or OAM, for example through the TCE. The communication $232_i$ informs the OAM, for example the TCE, of the monitoring result 230 sent by terminal $110_{1i}$, i=1,2, . . .

The description of FIG. 5 is also a description of FIG. 6 and equivalent references have been used. However, FIG. 6 relate to Type 2 configured grant, not type 1 and therefore has some consequent changes as described above, namely the splitting of the gNB node 120 into a CU and one or more DUs, the additional signaling 242, 262, 246 between the CU and DU, and the additional signaling 244, 264 between a DU and the terminal 110.

"Configured grant" is also known as "grant-free". With grant-free scheduling, the network 100 pre-configures the radio resources and allocates them to terminals 110 without waiting for the terminals 110 to request resources via the random access procedure. The terminals 110 can use the pre-allocated resources as soon as they have data to transmit without having to go through a random access procedure. This is in contrast to grant-based scheduling, where terminals must request access to radio resources through the random access procedure. With grant-free scheduling, the access node 120 reserves resources for uplink transmissions 302 and informs the terminals 110 of the reserved resources. When a terminal 110 wants to initiate an uplink transmission 302, it uses the reserved resources, without sending a request and waiting for the subsequent grant message from the access node 120. This reduces latency.

In at least some examples, during configured grant, a terminal 110 can be configured for Hybrid Automatic Repeat Request. The terminal transmits automatically a specific number of repetitions of transmission 302 without waiting for acknowledgement. These repetitions are only allowed to be carried out in a specific time interval.

In Type 1 configured grant, the access node 120 configures the terminal using layer 3 signaling. In 3GPP, this is Radio Resource Control (RRC) signaling.

RRC provides the UL grant configuration to the terminal 110 via the ConfiguredGrantConfig information element which includes rrc-ConfiguredUplinkGrant.

In Type 2 configured grant, the access node 120 configures the terminal using a combination of layer 3 signaling and layer 1 signaling. In 3GPP, layer 3 signaling is Radio Resource Control (RRC) signaling. In 3GPP, layer 1 signaling is Physical layer (PHY) signaling. It can be performed via the physical downlink control channel (PDCCH) using Downlink Control Information (DCI).The Grant is activated and deactivated through DCI scrambled with CS-RNTI. RRC only provides the higher layer parameter ConfiguredGrantConfig (not including rrc-ConfiguredUplinkGrant). The DCI signaling can enable fast modification of semi-persistently allocated resources. In this way, it enables the flexibility of uplink Grant Free transmission.

Both Type 1 and Type 2 are configured by RRC per Serving Cell and per BWP. For the same Serving Cell, the NR MAC entity is configured with either Type 1 or Type 2.

Further features of configured grant Type 1 and Type 2 are described in 3GPP TS 38.321 s5.82.

In the example illustrated in FIG. 5:

There is, optionally, messaging 210 between nodes $120_1$ and $120_2$ of the Type 1 uplink grant configurations that are in use. The signaling can be via the Xn or X2 interfaces with Xn application protocol (XnAP) or X2 application protocol (X2AP) signaling respectively.

The neighboring nodes $120_1$ and $120_2$ can coordinate through XnAP signaling about all the UL grant patterns they have in use for different terminals $110_{1x}$, $110_{2x}$.

The OAM in the core 129 sends Trace activation parameters 212 to the node $120_1$.

The parameters 212 include, in this example:
a parameter indicating immediate MDT;
a parameter indicating that the transmission 302 are in a particular unlicensed band;
a parameter indicating the access type of transmissions 302 as uplink Grant Type 1;
a parameter indicating what is to be monitored, for example, the listen before talk (LBT) failure rate;
one or more parameters controlling monitoring; and
one or more parameters controlling reporting of monitoring.

The node $120_1$ sends a monitoring configuration 220 to a terminal 110. In this example, the node $120_1$ sends a monitoring configuration $220_1$ to a terminal $110_{11}$ and sends a monitoring configuration $220_2$ to a terminal $110_{12}$. The monitoring configuration $220_1$ and the monitoring configuration $220_2$ can be the same.

In this example the monitoring configurations $220_1$, $220_2$ are a MDT configuration.

The MDT configuration comprises:
the parameter indicating the access type of transmissions 302 as uplink Grant Type 1;
the parameter indicating what is to be monitored, for example, the listen before talk (LBT) failure rate;
the one or more parameters controlling monitoring; and
the one or more parameters controlling reporting of monitoring.

The parameter indicating the access type of transmissions 302 is the uplink transmission type identifier 222.

The parameter(s) for controlling monitoring and/or controlling reporting of monitoring can be event-based. The monitoring configuration can be an MDT configuration. A few examples include the following:

(i) The first LBT Failure at the terminal 110 can trigger monitoring, calculation of the LBT Failure Rate and reporting of the LBT failure rate. The terminal 110 could continue calculating and reporting LBT Failure Rate every time a new LBT occurs or periodically.

(ii) The number of consecutive LBT Failures exceeding a (e.g. network configured) threshold, can trigger monitoring, calculation of the LBT Failure Rate and reporting of the LBT failure rate. The trigger could be, for example, three LBT Failures happening consecutively. The threshold may be given to the terminal 110 along with the monitoring configuration 220.

The network can select the threshold so that it is more "re-active" to LBT failures (small value of the threshold is configured at the terminal 110) or "less reactive" (higher value of the threshold is configured at the terminal 110).

The terminal 110 can continue calculating and reporting LBT Failure Rate every time an LBT failure happens, after exceeding the threshold, or may report LBT Failure Rate periodically.

(iii) The number of consecutive LBT successes exceeding a (network configured) threshold, can trigger monitoring, calculation of the LBT Failure Rate and reporting of the LBT failure rate. The trigger could be, for example, 20 LBT successes happening consecutively. The threshold may be given to the UE along with the monitoring configuration 220.

The network can select the threshold so that it is more "re-active" to LBT successes (small value of the Threshold is configured at the terminal 110) or "less reactive" (higher value of the Threshold is configured at the terminal 110).

The terminal 110 can continue calculating and reporting LBT Failure Rate every time an LBT success happens, after exceeding the threshold, or may report LBT Failure Rate periodically.

iv) The LBT failure rate exceeding a (network configured) threshold, can trigger reporting of the LBT failure rate. The threshold may be given to the UE along with the monitoring configuration 220.

The parameter(s) for controlling monitoring and/or controlling reporting of monitoring can be also time-based.

For example, the terminal 110 can immediately monitor, calculate and report the LBT failure rate immediately when the terminal 110 receives the monitoring configuration 220. Alternatively, the terminal 110 can start reporting, automatically, LBT Failure Rate after a certain point in time.

Immediate MDT reporting in unlicensed band may require a different configuration to Immediate MDT reporting in a licensed frequency band. In licensed spectrum, immediate MDT can provide real-time reporting of measurements. When using unlicensed spectrum, it is possible that the channel is busy when a measurement is taken. Immediate MDT for unlicensed band may need to involve storing of the measurements for later reporting, when the channel is found to be free again. A new Immediate MDT configuration for unlicensed band with storing capability can therefore be defined. The signaling of this configuration can be through the monitoring configuration 220 by requesting Immediate MDT measurements for unlicensed access. The terminal 110 would need to have memory to store its "real-time" measurements.

The terminal 110 can continue reporting its LBT Failure Rate periodically. The terminal 110 can alternatively continue reporting LBT failure rate while its value stays above or below a threshold.

The parameter(s) for controlling monitoring and/or controlling reporting of monitoring in the monitoring configuration 220 can be event-based and/or time-based. For example, a combination of event-based and time-based triggers can be used. When both time-based and event-based conditions are satisfied, the terminal 110 is triggered to monitor, calculate and report the LBT Failure Rate, for example, after a certain time instant and when the LBT Failure Rate exceeds/or is below a certain threshold value.

The parameter(s) for controlling monitoring and/or controlling reporting of monitoring can stop monitoring and/or reporting. Such parameters can, for example, be time-based requiring a certain length of time to expire before access. Such parameters can, for example, be event-based requiring a certain failure rate or failure number in respect of a certain duration.

The terminals 110 perform monitoring 310 configured by the monitoring configuration 220 to determine a failure rate of the uplink transmission type. The uplink transmission type is identified by an uplink transmission type identifier 222 in the monitoring configuration 220. In this example it is configuration grant Type 1.

The terminals $110_{11}$, $110_{12}$ transmit to the node $120_1$ a respective monitoring result $230_1$, $230_2$ dependent upon the performed monitoring 310 at the respective terminals $110_{11}$, $110_{12}$.

In this example, the monitoring result is an Immediate MDT Report. The Immediate MDT report comprises a parameter indicating the access type of transmissions 302 as uplink Grant Type 1, a parameter indicating a measurement result e.g. LBT failure rate, and optionally one or more parameters relating to control of monitoring and/or reporting of monitoring.

There is a communication 232 between the node $120_1$ and the TCE for each respective terminal $110_{11}$, $110_{12}$. The communication $232_i$, i=1,2 informs the TCE of the monitoring result 230 sent by terminal $110_{1i}$.

At block 320, the node $120_1$ takes an uplink grant type 1 decision based on multiple LBT failure rate values, for example as received via monitoring results $230_1$, $230_2$. The node $120_1$ can use the LBT Failure Rate information received from a terminal 110 (or terminals 110) to re-adjust its grant-free configuration. For example, it can reconfigure Type 1 UL Grants at one or more terminals 110.

Thus the node 120, in dependence upon the received monitoring result 230, can control 320 adjustment of scheduling of the uplink transmission type by sending one or more control messages 240 to one or more terminals 110.

In this example, the control message 240 is a New type 1 UL Grant configuration. A type 1 UL Grant configuration is a RRC reconfiguration messages that provide new type 1 uplink grant parameters.

In the example illustrated, but not necessarily all examples, the node $120_1$, in dependence upon the received monitoring result(s) 230, transmits an information message 250 to the neighboring node $120_2$ to inform the neighboring node $120_2$ of an adaptation of scheduling of the uplink transmission type by the node $120_1$.

The neighboring node $120_2$ can, in some examples, transmit a control message 260 to a terminal $110_{21}$, served by the neighboring node $120_2$, to instruct the terminal $110_{21}$ to adapt a scheduling of the uplink transmission type.

Thus, to avoid inter-cell grant-free configuration conflicts, when the node $120_1$ reconfigures an UL Grant at a given terminal 110, it can also send, through an interface, for example an X2 or Xn interface, to its neighboring nodes 120 the information message 250 defining the new grant free configuration it has taken into use, e.g., by sending a "new Type 1 UL Grant Configuration" IE. Together with the newly used UL Grant Configuration the node $120_1$ may also send an associated measured LBT failure rate.

The "new Type 1 UL Grant Configuration" IE can be included in:
Served Cell Information NR IE in XN SETUP REQUEST/RESPONSE messages or
Served Cell Information NR IE in NG-RAN NODE CONFIGURATION UPDATE message or
A newly defined XnAP message.

This may help the neighbor nodes 120 detect possible conflicts if they observe an increased LBT Failure Rate reported by terminals 110 they serve using the newly selected grant-free configuration. This may also help the neighboring nodes 120 to avoid using an UL Grant Configuration used by a neighbor node 120 when possible.

FIG. 6 is similar to FIG. 5. However, whereas FIG. 5 is an example in which the identified uplink transmission type is Type 1 configured grant, FIG. 6 is an example in which the identified uplink transmission type is Type 2 configured grant.

The method illustrated in FIG. 6 is the same as illustrated in FIG. 5 except for the following changes:

The messaging 210 between nodes $120_1$ and $120_2$ is Type 2 uplink grant configurations that are in use instead of Type 1 uplink grant configurations that are in use.

The parameters 212 include, in this example: a parameter indicating the access type of transmissions 302 as uplink Grant Type 2 instead of a parameter indicating the access type of transmissions 302 as uplink Grant Type 1

The monitoring configurations $220_1$, $220_2$ (MDT configuration) comprises: the parameter indicating the access type of transmissions 302 as uplink Grant Type 2 instead of the parameter indicating the access type of transmissions 302 as uplink Grant Type 1.

As in FIG. 5, in FIG. 6, the terminals 110 perform monitoring 310 configured by the monitoring configuration 220 to determine a failure rate of the uplink transmission type. The uplink transmission type is identified by an uplink transmission type identifier 222 in the monitoring configuration 220. However, in this example it is configuration grant Type 2 instead of Type 1.

The monitoring result 230 (Immediate MDT report) comprises a parameter indicating the access type of transmissions 302 as uplink Grant Type 2 instead of Type 1.

At block 320, the node $120_1$ takes an uplink grant type 2 decision (instead of a Type 1 decision) based on multiple LBT failure rate values, for example as received via monitoring results $230_1$, $230_2$.

The node $120_1$ can use the LBT Failure Rate information received from a terminal 110 (or terminals 110) to re-adjust its grant-free configuration. For example, it reconfigures Type 2 UL Grants, instead of Type 1 UL Grants, at one or more terminals 110.

In FIG. 6 the control of reconfiguring the configured grant for the terminal $110_{1x}$ uses a RRC control message $240_x$ delivered from the CU of the gNB node $120_1$ to terminal 110 and a message $242_x$ delivered from the CU of the gNB node $120_1$ to the DU of gNB node $120_1$ which causes the DU of the gNB node $120_1$ to send a PHY message $244_x$ to the terminal $110_{1x}$. In the example illustrated in FIG. 6, the index x=1.

A Type 2 UL Grant Configuration may contain both RRC-relevant parameters as well as lower layer parameters. The control message $240_x$ is the RRC-relevant component of a Type 2 UL Grant configuration (instead of a Type 1 UL Grant configuration). The message $242_x$ contains the lower layer parameters of the Type 2 UL Grant Configuration that needs to be forwarded to a DU. The message $242_x$ provides MAC/PHY parameters. The message can, for example, comprise an identity of the terminal $110_{11}$, MAC/PHY parameters, and LBT Failure rate associated with those. The message $244_x$ can send a PDCCH reconfiguration to the UE with new MAC/PHY parameters for Type 2 UL Grant that UE should use.

The message $246_x$ is an UL Grant Scheduling Information message. It can comprise an identifier of the terminal $110_{11}$ and the new PHY/MAC parameters. Here, x=1.

The information message 250 defining the new grant free configuration taken into use, is a "new Type 2 UL Grant Configuration" IE.

The control of reconfiguring the configured grant for the terminal $110_2$ uses a RRC control message 260 delivered from the CU of the gNB node $120_2$ to terminal $110_{21}$ and a message 262 delivered from the CU of the gNB node $120_2$ to the DU of gNB node $120_2$ which causes the DU of the gNB node $120_2$ to send a PHY message 244 to the terminal $110_{21}$.

The control message 260 is a New type 2 UL Grant configuration. A type 2 UL Grant configuration provides RRC type 2 uplink grant parameters.

The message 262 provides MAC/PHY parameters. The message can, for example, comprise MAC/PHY parameters, and LBT Failure rate associated to those.

The message 264 is a PDCCH reconfiguration. It provides the new MAC/PHY parameters for Type 2 UL Grant.

In the preceding examples, the LBT failure rate can be calculated based on the specific access of the terminal.

The calculation of LBT failure rate can be explicitly or implicitly controlled by the monitoring configuration 220. Explicit control can use a parameter that identifies the calculation to be used and/or provides parameters for the calculation. Implicit control identifies the access type via the uplink transmission type identifier 222 which determines the calculation to be used.

Different methods to calculate LBT failure rate include:
i) count the LBT failures for a specific configured UL grant divided by LBT trials for the same configured UL grant
ii) calculate LBT failure rate for configured UL grant as in (i), then calculate LBT failure rate for generic case by: "counting the LBT failures for all channel accesses divided by LBT trials for all channel accesses". The purpose of using the LBT failure rate for generic case is to compare the performance of configured grant access against generic case to see if high failure rate for configured grant is caused by high channel load in general or some specific problem with grant configuration. For example, a ratio r between the two can be calculated where r=LBT failure rate for configured grant/LBT failure rate for all accesses. This can be used as the failure rate.

For example, LBT failure rate for configured grant can be compared against a threshold and the LBT failure rate for all accesses can be compared against a threshold. The results of the comparison can be used as or to create the failure rate.

As previously described, in some examples, a node 120 can use information received from other nodes (e.g. via information messages 250 sent through an interface, for example an X2 or Xn interface), for example, to avoid unintended synchronization with scheduling of uplink transmissions with other terminals served by different nodes 120.

If node 120 reconfigures an UL Grant at a given terminal, it can send through X2/Xn interface to its neighbouring node(s) the new configuration it takes into use, using: (i) Served Cell Information NR IE in XN SETUP REQUEST/ RESPONSE messages or (ii) Served Cell Information NR IE in NG-RAN NODE CONFIGURATION UPDATE message or (iii) a newly defined XnAP message. The new UL Grant Configuration in use can be included inside a "new Type 1 UL Grant Configuration" IE which may contain the following parameters pertaining to Type 1 Uplink Grant:
  Subcarrier Spacing (SCS)
  Time Reference SFN
  timeDomainOffset
  timeDomainAllocation
  frequencyDomainAllocation
  frequencyHoppingOffset
  pusch-RepTypeIndicator
  frequencyHoppingPUSCH-RepTypeB
  Periodicity
  frequencyHopping
  resourceAllocation
  rbg-Size
  transformPrecoder Alternatively, the new configuration can, for example, be defined via a "new Type 2 UL Grant Configuration" IE which may contain both RRC-relevant parameters as well as lower layer parameters. The following parameters pertaining to Type 2 Uplink Grant are RRC-relevant parameters:
  Subcarrier Spacing (SCS)
  Periodicity
  frequencyHopping
  resourceAllocation
  rbg-Size
  transformPrecoder The following parameters pertaining to Type 2 Uplink Grant are PDCCH DCI-relevant parameters:
  Bandwidth part indicator
  Frequency domain resource assignment
    Number of RBGs (for resource allocation type 0)
    Resource allocation
    PUSCH frequency hopping offset
    Frequency domain resource allocation for interlace
  Time domain resource assignment
  Frequency hopping flag Both RRC-relevant and PDCCH DCI-relevant parameters are sent in message 250. They can be included for example in a "new Type 2 UL Grant Configuration" IE inside (i) Served Cell Information NR IE in XN SETUP REQUEST or XN SETUP RESPONSE messages or inside (ii) Served Cell Information NR IE in NG-RAN NODE CONFIGURATION UPDATE message or in (iii) a newly defined XnAP message. The PDCCH DCI-relevant parameters can be subsequently forwarded for example inside a "new Type 2 UL Grant Configuration" IE or inside a different or newly defined IE from the CU to a DU inside the Neighbour Cell Information List IE in the gNB-CU CONFIGURATION UPDATE message in the message 262.

The PDCCH DCI-relevant parameters can be forwarded from CU to DU when CU sends a new Type 2 UL Grant UL Grant to a UE also inside, for example, the Served Cell Information List IE in the gNB-CU CONFIGURATION UPDATE message in the message 242.

Figure 7:
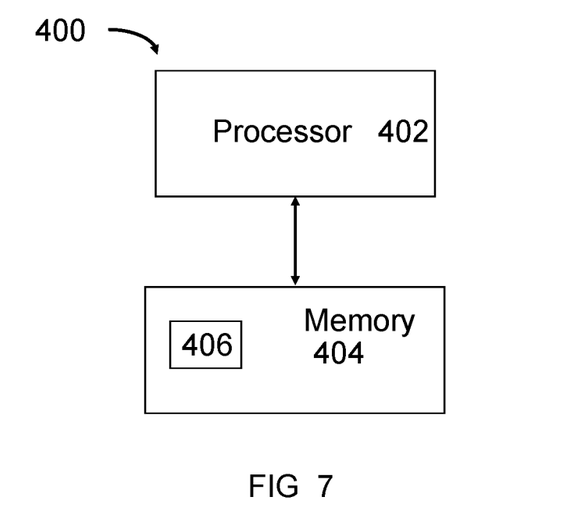
FIG. 7 shows another example of the subject matter described herein.

FIG. 7 illustrates an example of a controller 400. Implementation of a controller 400 may be as controller circuitry. The controller 400 may be implemented in hardware alone, have certain aspects in software including firmware alone or can be a combination of hardware and software (including firmware).

As illustrated in FIG. 7 the controller 400 may be implemented using instructions that enable hardware functionality, for example, by using executable instructions of a computer program 406 in a general-purpose or specialpurpose processor 402 that may be stored on a computer readable storage medium (disk, memory etc.) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of an apparatus 110, 120 when loaded into the processor 402. The computer program instructions, of the computer program 406, provide the logic and routines that enable the apparatus to perform the method as illustrated in FIGS. 1 to 6. The processor 402 by reading the memory 404 is able to load and execute the computer program 406.

The apparatus 110 therefore comprises:
at least one processor 402; and
at least one memory 404 including computer program code
the at least one memory 404 and the computer program code configured to, with the at least one processor 402, cause the apparatus 110 at least to perform:
monitoring, in accordance with a received monitoring configuration, to determine a failure rate of an uplink transmission type identified by the received monitoring configuration; and
transmitting a monitoring result dependent upon the performed monitoring.

The apparatus 120 therefore comprises:
at least one processor 402; and
at least one memory 404 including computer program code
the at least one memory 404 and the computer program code configured to, with the at least one processor 402, cause the apparatus 120 at least to perform:
transmitting a monitoring configuration, comprising an uplink transmission type identifier, to a terminal;
receiving from the terminal a monitoring result in dependence upon the monitoring configuration and a failure rate of the uplink transmission type;
causing adaptation of a scheduling of an uplink transmission type of at least one terminal in dependence on the received monitoring result.

The apparatus 120 therefore comprises:
at least one processor 402; and
at least one memory 404 including computer program code
the at least one memory 404 and the computer program code configured to, with the at least one processor 402, cause the apparatus 120 at least to perform:
receiving a message from a neighboring node in dependence upon a monitoring result for a transmission type received at the neighboring node from a terminal that is served by the neighboring node but not the node; and
causing adaptation of the scheduling of a transmission type of at least one terminal served by the node in dependence on the received message.

Figure 8:
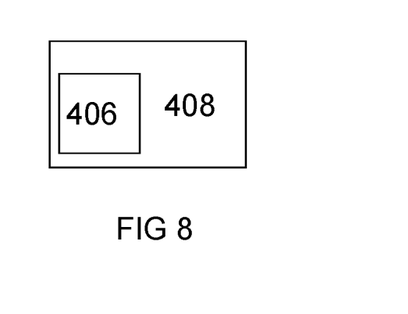
FIG. 8 shows another example of the subject matter described herein.

As illustrated in FIG. 8, the computer program 406 may arrive at the apparatus 110, 120 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 406. The delivery mechanism may be a signal configured to reliably transfer the computer program 406. The apparatus 110, 120 may propagate or transmit the computer program 406 as a computer data signal.

Computer program instructions for causing an apparatus to perform at least the following or for performing at least the following:

A computer program 406 can be configured so that when run by a processor of a terminal 110, it enables the terminal 110 to:
perform monitoring, in accordance with a received monitoring configuration, to determine a failure rate of an uplink transmission type identified by the received monitoring configuration; and
transmit a monitoring result dependent upon the performed monitoring.

A computer program 406 can be configured so that when run by a processor of a node $120_1$ of a network, it enables the node $120_1$ to:
transmit a monitoring configuration 220, comprising an uplink transmission type identifier 222, to a terminal $110_1$;
receive from the terminal $110_1$ a monitoring result 230 in dependence upon the monitoring configuration 220 and a failure rate of the uplink transmission type;
cause 320 adaptation of a scheduling of an uplink transmission type of at least one terminal $110_1$ in dependence on the received monitoring result 230.

A computer program 406 can be configured so that when run by a processor of a node $120_2$ of a network, enables the node $120_2$ to:
receive a message 250 from a neighboring node $120_1$ in dependence upon a monitoring result 230 for a transmission type received at the neighboring node $120_1$ from a terminal $110_1$ that is served by the neighboring node $120_1$ but not the node $120_2$; and
cause adaptation of the scheduling of a transmission type of at least one terminal $110_2$ served by the node $120_2$ in dependence on the received message 250.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/ dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 9A:
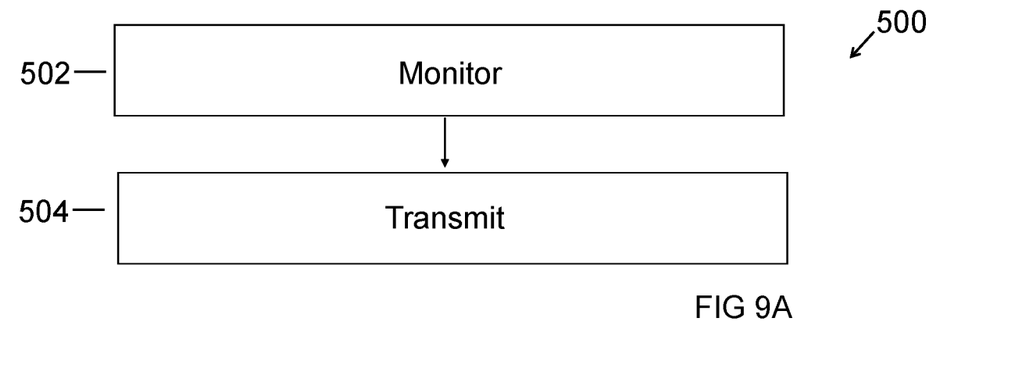
FIG. 9A shows another example of the subject matter described herein.

FIG. 9A illustrates a method 500. The method 500 can, for example, be performed at a terminal 110.

The method 500 comprises, at block 502, monitoring, in accordance with a received monitoring configuration, to determine a failure rate of an uplink transmission type identified by the received monitoring configuration.

The method 500 comprises, at block 504, transmitting a monitoring result dependent upon the performed monitoring.

Figure 9B:
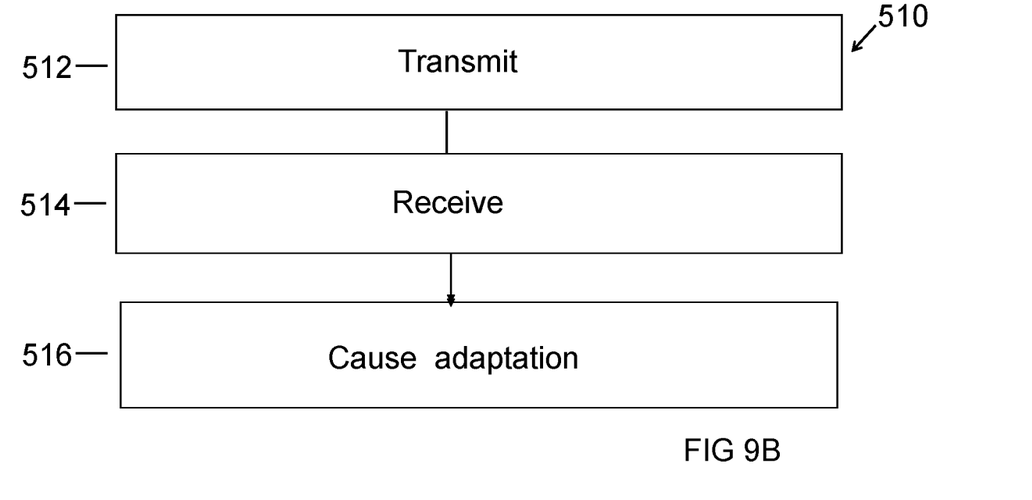
FIG. 9B shows another example of the subject matter described herein.

FIG. 9B illustrates a method 510. The method 510 can, for example, be performed at an access node 120, for example the access node 120 serving the terminal 110.

The method 510 comprises, at block 512, transmitting a monitoring configuration, comprising an uplink transmission type identifier, to a terminal.

The method 510 comprises, at block 514, receiving from the terminal a monitoring result in dependence upon the monitoring configuration and a failure rate of the uplink transmission type.

The method 510 comprises, at block 516, causing adaptation of a scheduling of an uplink transmission type of at least one terminal in dependence on the received monitoring result.

Figure 9C:
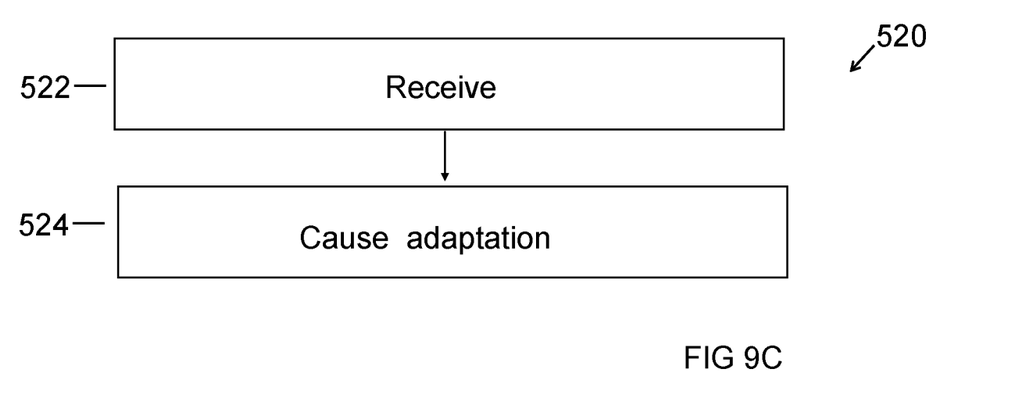
FIG. 9C shows another example of the subject matter described herein.

FIG. 9C illustrates a method 520. The method 520 can, for example, be performed at an access node 120, for example an access node 120 not serving the terminal 110.

The method 520 comprises, at block 522, receiving a message from a neighboring node in dependence upon a monitoring result for a transmission type received at the neighboring node from a terminal that is served by the neighboring node but not the node.

The method 520 comprises, at block 524, causing adaptation of the scheduling of a transmission type of at least one terminal served by the node in dependence on the received message.

The blocks illustrated in the FIGS. 1 to 6 may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A terminal comprising:
   at least one processor; and
   at least one memory including computer program code, the at least one memory and the computer program code configured to, with the at least one processor, cause the terminal to:
   receive, from a network node, a monitoring configuration comprising an uplink transmission type identifier associated with an uplink transmission type and a trigger threshold, wherein the uplink transmission type identifier identifies uplink transmissions as uplink transmissions using a configured grant, wherein the configured grant is a Type 1 configured grant provided via Radio Resource Control (RRC) signaling including a ConfiguredGrantConfig with rrc-ConfiguredUplinkGrant for a specific serving cell and bandwidth part, and wherein the monitoring configuration is an Immediate minimization of drive testing (MDT) configuration for the uplink transmissions in an unlicensed Industrial, Scientific and Medical (ISM) band;
   perform monitoring, in accordance with the monitoring configuration, to determine a listen before talk (LBT) failure rate of the uplink transmission type, wherein the LBT failure rate is computed as a ratio of a count of LBT failures for the specific Type 1 configured uplink grant divided by LBT trials for that same configured uplink grant;
   transmit, to the network node, a monitoring result corresponding to the determined LBT failure rate in response to detecting a trigger event, wherein the trigger event is one of a first LBT failure and a number of consecutive LBT failures exceeding the trigger threshold, wherein the monitoring result is an Immediate MDT report that includes (i) an indication that the access type is uplink Grant Type 1, and (ii) a value of the computed LBT failure rate, and is transmitted with low latency of less than 100 ms when channel access permits, or storing the measurement for later reporting when the channel is free; and
   adapt a scheduling of the uplink transmission type, after transmitting the monitoring result, only upon receiving a command from the network node.

2. The terminal as claimed in claim 1, wherein the uplink transmission type identifier identifies the uplink transmissions as uplink transmissions using the configured grant that is configured without layer 1 signaling or with layer 1 signaling.

3. The terminal as claimed in claim 1, wherein the monitoring configuration configures when monitoring of the uplink transmission type occurs and when a result of monitoring of the uplink transmission type is reported.

4. The terminal as claimed in claim 1, wherein the monitoring configuration configures when monitoring of the uplink transmission type occurs and when a result of monitoring of the uplink transmission type is reported by using one or more trigger parameters in the monitoring configuration, and wherein a trigger parameter is at least one of an event-based trigger parameter and a time-based trigger parameter.

5. The terminal as claimed in claim 1, wherein the monitoring result at least identifies the uplink transmission type.

6. The terminal as claimed in claim 1, wherein the uplink transmission type is used for uplink communication for the following purposes:
   the terminal provides periodic deterministic communication;
   the terminal provides monitoring results for one or more industrial wireless sensors;
   the terminal provides a node in the Industrial Internet of Things;
   the terminal is configured to provide 3GPP ultra reliable low latency communication;
   the terminal provides real-time measurement;
   the terminal provides power distribution monitoring;
   the terminal is a component of a factory automation system;
   the terminal is a component of a transport automation system;
   the terminal is a component that enables remote driving of a vehicle.

7. The terminal as claimed in claim 1, wherein the terminal is configured as a mobile equipment or a user equipment, of a radio network.

* * * * *